United States Patent [19]

Kupfernagel

[11] Patent Number: 4,758,030
[45] Date of Patent: Jul. 19, 1988

[54] LATCH MECHANISM IN AIRCRAFT CARGO HATCHES WITH A SINGLE LEVER PIVOTABLE ABOUT TWO AXES

[75] Inventor: Artur Kupfernagel, Stuhr, Fed. Rep. of Germany

[73] Assignee: Messerschmitt-Boelkow-Blohm GmbH, Bremen, Fed. Rep. of Germany

[21] Appl. No.: 928,532

[22] Filed: Nov. 7, 1986

[30] Foreign Application Priority Data

Nov. 7, 1985 [DE] Fed. Rep. of Germany ....... 3539480

[51] Int. Cl.$^4$ .............................................. B64C 1/14
[52] U.S. Cl. .................................. 292/26; 292/336.3; 292/48; 292/27; 292/29; 244/129.5
[58] Field of Search ...................... 292/24, 26, 27, 29, 292/336.3, 97, 48, 194, 217; 98/1.5; 244/129.4, 129.5 X

[56] References Cited

U.S. PATENT DOCUMENTS

| | | |
|---|---|---|
| 2,751,636 | 6/1956 | Heinemann et al. .............. 244/129.5 |
| 3,051,280 | 8/1962 | Bergman et al. .................. 244/129.5 |
| 3,085,297 | 4/1963 | Linderfelt ........................ 244/129.5 |
| 3,113,352 | 12/1963 | Gibbs et al. .......................... 292/201 |
| 3,647,169 | 3/1972 | Allwright et al. ................ 244/129.5 |
| 4,199,120 | 4/1980 | Bergman et al. .................. 244/129.5 |
| 4,473,201 | 9/1984 | Barnes et al. ..................... 244/129.5 |
| 4,510,714 | 4/1985 | Kasper ............................. 244/129.5 |
| 4,560,123 | 12/1985 | Sealey et al. ..................... 244/129.5 |
| 4,607,812 | 8/1986 | DeHann et al. .................. 244/129.5 |

FOREIGN PATENT DOCUMENTS

| | | | |
|---|---|---|---|
| 491774 | 8/1948 | Canada ..................... 292/DIG. 31 |
| 497054 | 10/1953 | Canada ............................ 292/336.3 |
| B33637 | 9/1956 | Fed. Rep. of Germany ... 292/336.3 |
| 1237504 | 6/1960 | France ............................... 292/336.3 |
| 183597 | 12/1966 | U.S.S.R. ................................ 292/26 |

Primary Examiner—Gary L. Smith
Assistant Examiner—Eric K. Nicholson
Attorney, Agent, or Firm—Ralf H. Siegemund

[57] ABSTRACT

A single lever is pivotable about two axes and pivoting can be carried out in a prescribed sequence such that first the latches are unloaded and thereafter released, in the reverse, the latches are first latched and thereafter proper latching is monitoring and the latches are locked. The structure includes two shafts that are operated by the lever and they carry respectively latch hooks and cams for latching and scanning these hooks.

9 Claims, 4 Drawing Sheets

FIG. 3
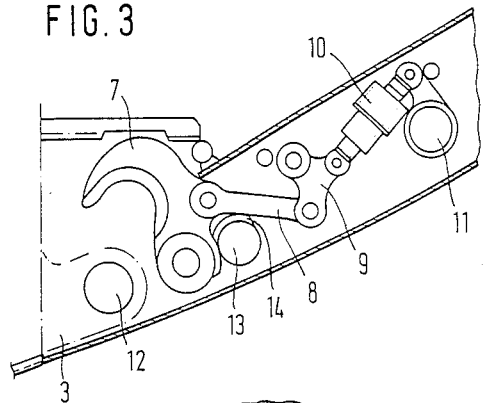
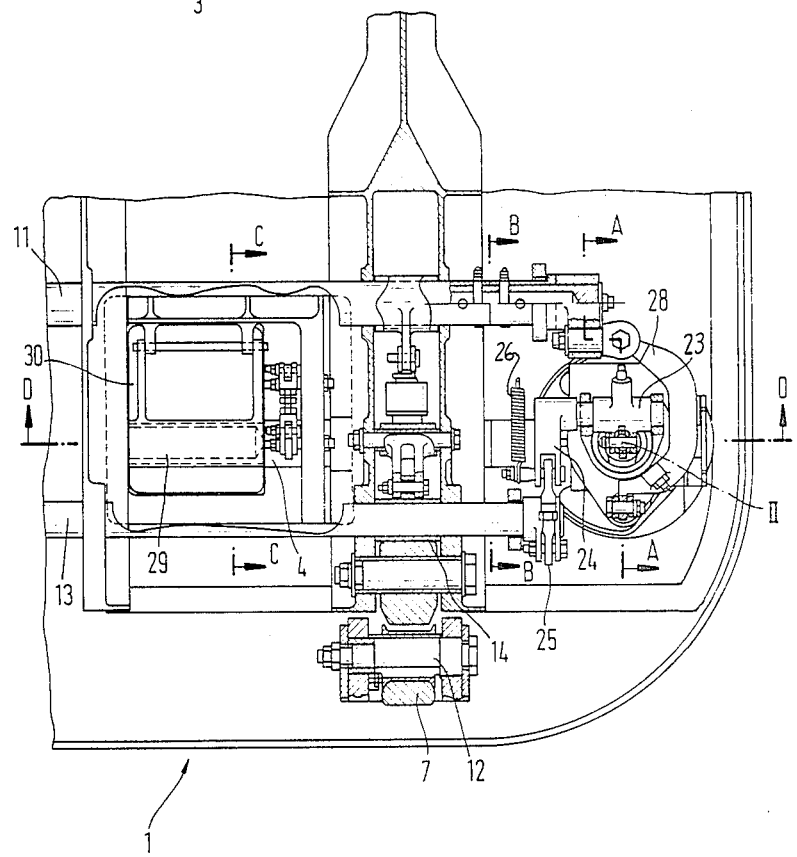
FIG. 4

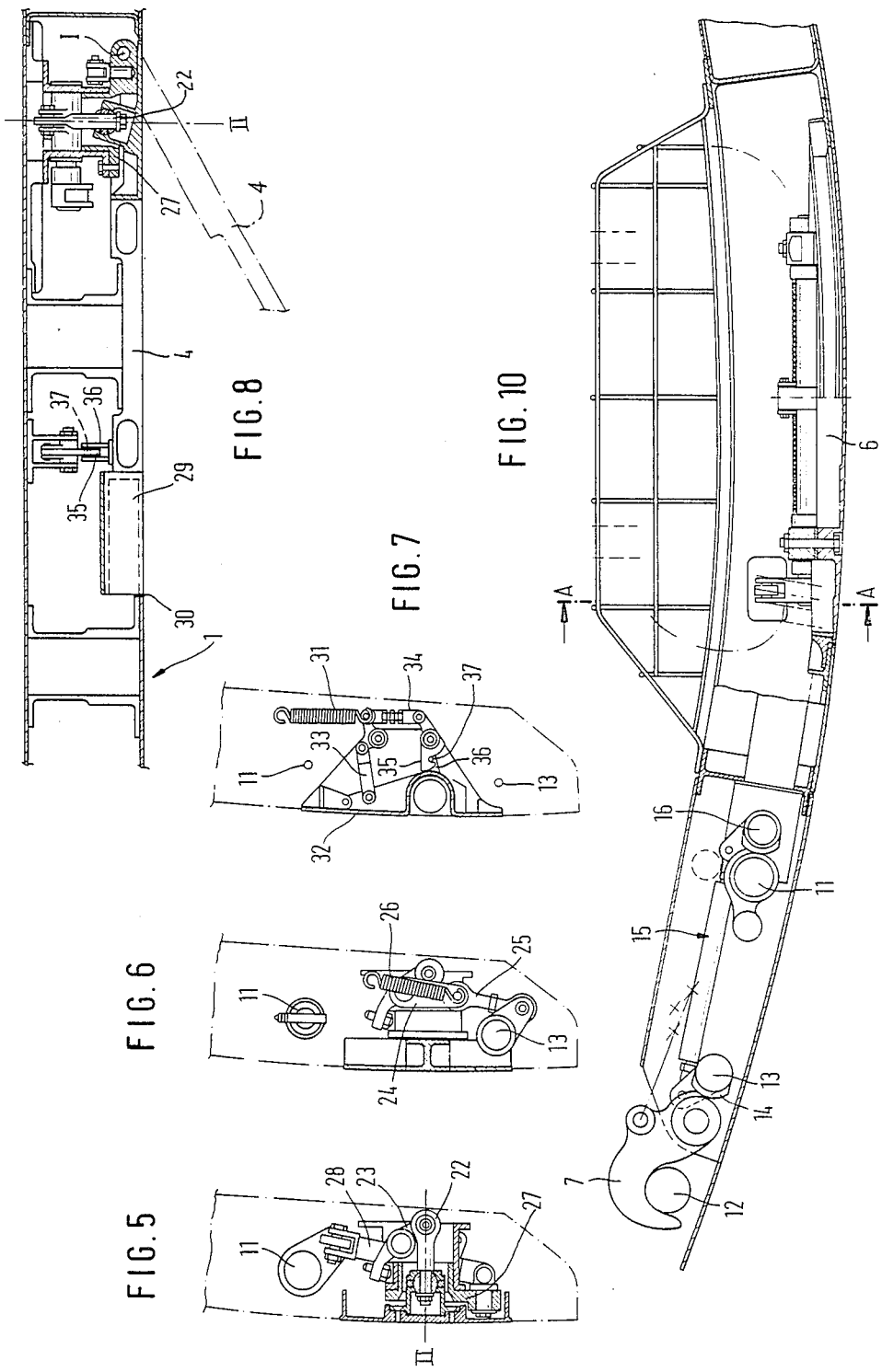

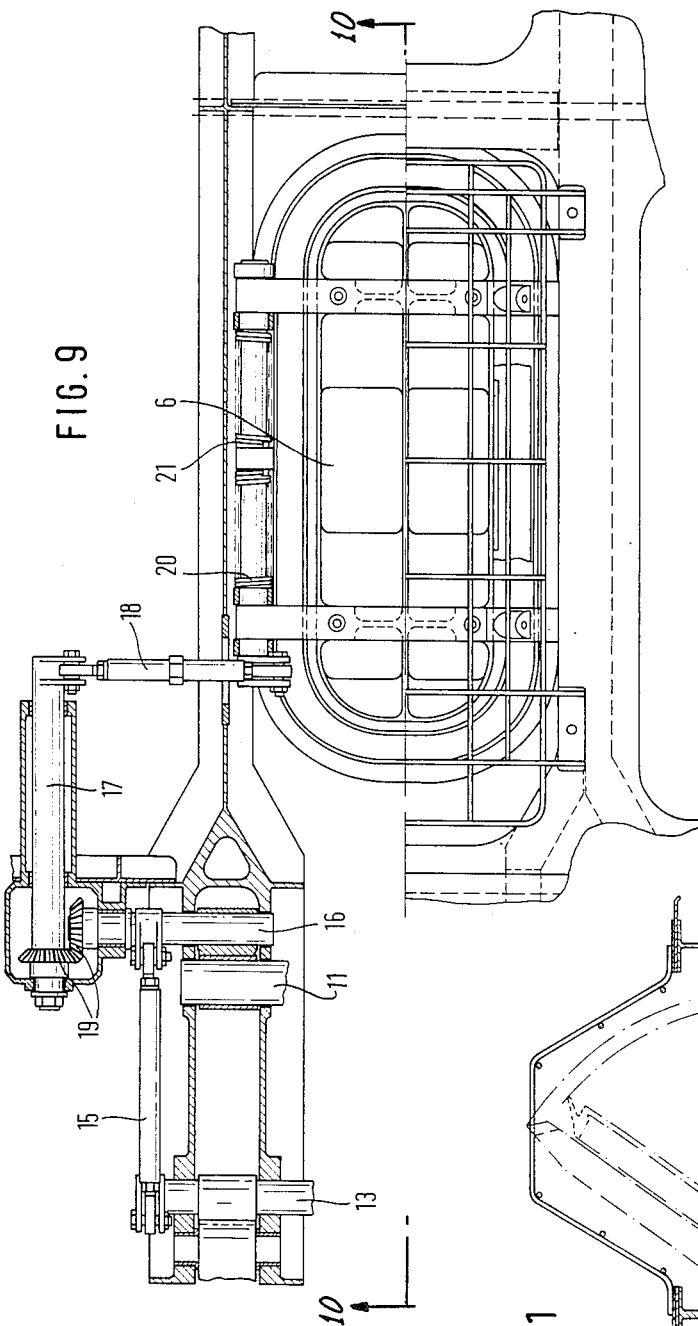
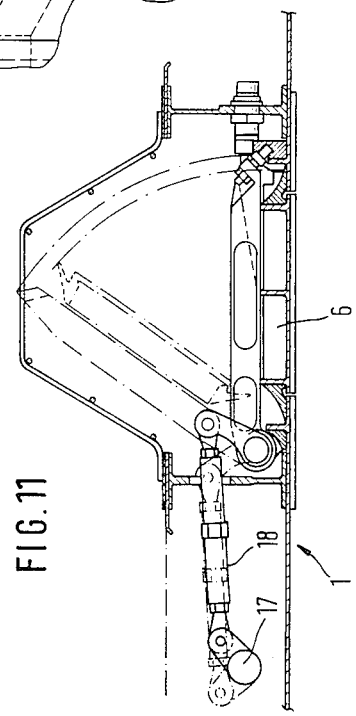

LATCH MECHANISM IN AIRCRAFT CARGO HATCHES WITH A SINGLE LEVER PIVOTABLE ABOUT TWO AXES

BACKGROUND OF THE INVENTION

The present invention relates to the actuation of a freight hatch in an aircraft which includes opening and closing facilities to be actuated from the outside, further includes latching locking and monitoring structures.

Actuation devices of the kind to which the invention pertains are known generally in a large variety and are used in freight or cargo as well as passenger aircraft, particularly of the hybrid variety having a passenger compartment and additional cargo space. Herein, it is particularly known that in addition to a separate operating structure for opening and closing one needs a manually or hydraulically actuated device which acts upon a central latch, particularly a latching shaft, which, in turn, through coupling members causes the activation of a plurality of latching hooks for purposes of latching and locking the hatch into the closed position. In addition, the known structure includes manual scanning and feeling mechanisms, by means of which, and through an additional handle, the latch position of the hooks and of the operating shaft can be scanned for safety purposes. Moreover, in addition, a pressure compensating flap in the freight hatch can be operated by the same mechanism or otherwise.

DESCRIPTION OF THE INVENTION

It is an object of the present invention to provide a new and improved actuating device of the type to which the invention pertains generally such that the operation and actuation of the latch as well as of the latch locking and monitoring is permitted only by means of a manually operated element which, at the same time, guarantees a reliable and interference-proof or interference-free latching of the freight hatch.

In accordance with the preferred embodiment of the present invention, it is suggested to provide for an actuation of the latching, locking and monitoring function through a common actuating lever which lever is pivotably mounted for pivoting about two, axes; these axes being at least approximately orthogonally arranged to each other such that the latching device on one hand and the latch locking and monitoring device on the other hand are respectively connectable to that lever with in an articulated fashion so that upon pivoting the lever about the first axis the latch control device is operated, and upon pivoting the lever about the second pivot axis the latch device is locked and its operating state is concurrently monitored or checked. The combination of the two operating functions "latching-unlatching" and "latch locking and monitoring" in a single operating element in accordance with the invention permits to time or to phase the two functions such that e.g. for unlatching the respective second one can occur only when the first one has been completed reliably and without encountering any interference with an inverse order observed for latching. This means, particularly, that the monitoring function can be carried out only after the latching procedure has been completed and conversely, unlatching is possible only after all latch elements have been released i.e. unloaded.

In the preferred form it is proposed that the pivot axis for the single actuating lever is at least approximately vertical while the other pivot axis for that lever extends basically transversely to the outer contour of the hatch. The lever should be connected to a latching shaft through coupling structure and that shaft in turn, is connected through additional coupling structures to pivotable latching hooks, cooperating with latching pins in the fuselage of the aircraft. Moreover, the lever is connected with a locking and monitoring shaft running approximately parallel to the first mentioned latching shaft and being provided with locking and scanning cams. These cams are associated with the aforementioned latching hooks and can be brought into engagement with them for (a) locking them but only (b) when the hooks are in a locking position! The locking and monitoring shaft is, in turn, connected with the pressure equalizing or compensating flap.

The principal single operating lever is locked by and in itself for a closed hatch when locked and latched. This lever is held preferably at (or on or in) the hatch such that it is flush with the outer contour of the freight, or cargo hatch in a neutral position. This lever is moreover provided with a handle received in a suitable recess in the outer contour of the hatch which recess, in turn, can be closed by a spring-loaded flap. This latter flap is preferably coupled with the locking structure for the lever holding the lever in the neutral position. In addition, the locking and monitoring shaft is connected to retractable locking pins which are accessible from the outside. If the hatch is provided at the lower level, the lever is arranged accordingly.

The various features outlined in the preceding paragraph are individually and collectively provided for enhancing reliability and safety of the requisite latching function and are particularly designed to ensure the desired sequence of functions such that that particular sequence cannot be deviated from, while on the other hand, the latch locking and monitoring functions will positively block undesired unlatching of the gate.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 illustrates a portion of the structure shown in FIG. 2 but in a different operational position;

FIG. 4 illustrates a portion, identified by the letter X in FIG. 1, but from the rear i.e. from the inside of the aircraft;

FIGS. 5, 6, 7, and 8, are respectively cross-sectional views in accordance with lines A—A, B—B, C—C, and D—D in FIG. 4;

FIG. 9 illustrates the portion identified by Y in FIG. 1, also from the rear and turned by 90 degrees;

FIG. 10 illustrates the portion shown in FIG. 9 in a section view as indicated by lines 10/10 in FIG. 9; and FIG. 11 is a detail, indicated by A—A in FIG. 10.

Proceeding now to the detailed description of the drawings, the example illustrated refers specifically to a freight or cargo hatch for access to the lower level cargo space in a commercial aircraft. The outer contour of the hatch 1, as well as the width of the opening in the aircraft are, of course, predetermined; that is to say the hatch itself cannot be adapted to the latching structure. The hatch is hinged by means of hinges 2 to the fuselage 3 along the upper edge of the hatch opening. In the lower portion, particularly near the lower edge of the hatch gate 1, are provided structures for latching the hatch in closed position. In addition, a locking structure is provided for ensuring that, in fact, the gate remains latched and that proper latching has been verified. Details of these devices and pieces of equipment will be developed next with reference to the various figures.

Figure 1:
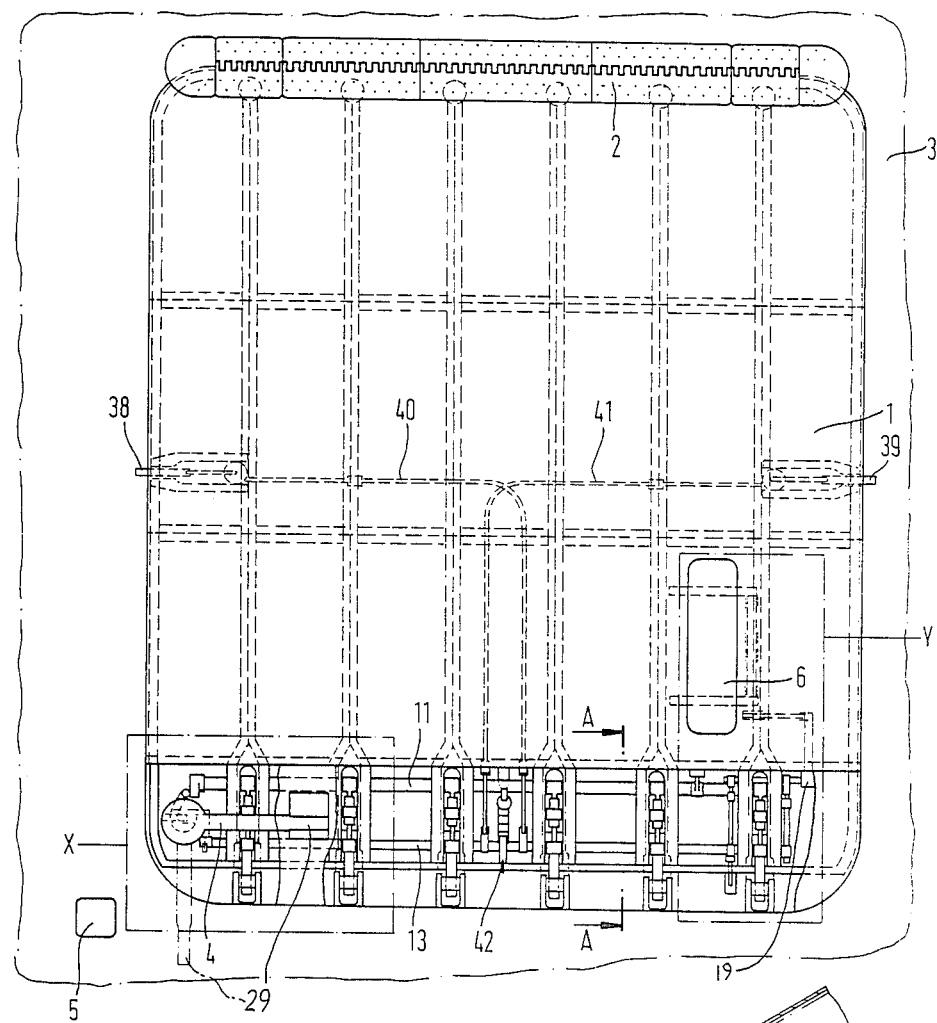
FIG. 1 illustrates a side elevation of a freight hatch or cargo hatch of an aircraft improved in accordance with the preferred embodiment of the present invention as far as actuation is concerned for practicing the best mode thereof.
Figure 2:
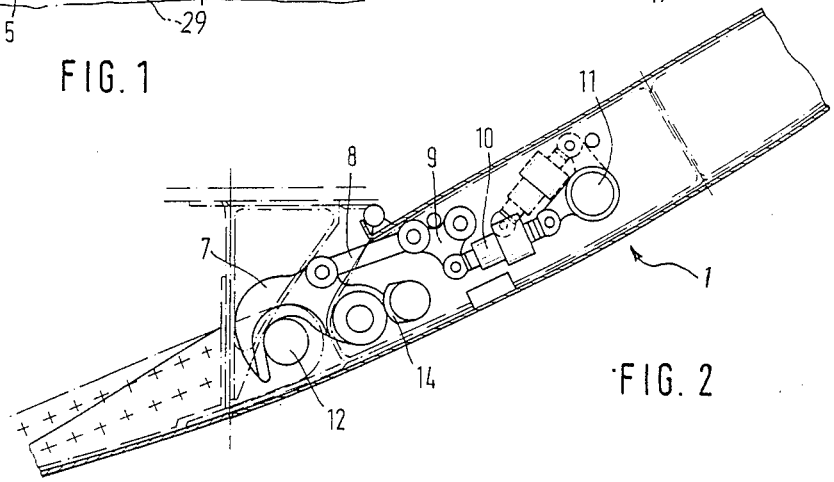
FIG. 2 illustrates a detailed section indicated by A—A in FIG. 1, the section has been turned for ease of illustration.

FIG. 1 shows the principal lever 4 basically by means of which all the various pieces of equipment which constitute the basic subject of the invention are being operated. In addition, an operating structure 5 is shown schematically for actually opening and closing the freight hatch. This is automatic equipment and usually involves drive motors and so forth, which are not parts of the present invention, and, therefore, do not have to be considered. Also shown in FIG. 1 is a pressure compensating flap 6 which will be described in greater detail below. Specifically, the exact structure for latching and latch-locking control and monitoring as well as the associated operating structure, will next be explained with reference to FIGS. 2 through 11.

The latching structure is basically established through a plurality of latching hooks 7 (FIGS. 2, 3, 10) which are, in turn, rotatably mounted and by means of coupling elements 8, 9, and 10 are eccentrically linked to a latching shaft 11. Hooks 7 cooperate with latching pins 12 which are secured to and extend from the fuselage structure 3, generally, and from the support frame thereof in particular.

A locking and monitoring shaft 13 is arranged in parallel to the latching shaft 11. The shaft 13 is provided with eccentrically arranged cams, locks, or projections 14 which, as far as the longitudinal extension is concerned, are juxtaposed to each other. Shaft 13 is positioned to the respective hooks 7 on the shaft 11 so that cams 14 are close to hooks. The shaft 13, moreover, acts upon and is connected to a pressure equalization flap 6 by operation of a coupling structure 15, 16, 17, and 18, as well as a bevel gear 19 (FIG. 9). The flap 6 is biased by means of two springs 20 and 21, biasing the flap into an opening disposition. For operating and actuating the latching structure 7 through 11, as well as the monitoring and locking structure 13 through 19, it is necessary to provide the lever 4 to be accessible from the outside of the freight hatch 1. This one arm lever is pivotably mounted for pivoting about two orthogonal or at least approximately orthogonal axes I and II. The various figures show the normal, neutral or resting and locking position of that lever at that position is generally illustrated in solid lines. In that normal, neutral or resting and contour position, lever 4 is flush with the outer contour of the hatch 1. As can be seen particularly from FIGS. 8 and 4, pivoting of the lever 4 about the first axis I is the equivalent of the rotational movement of lever 4 out of the flush position with hatch 1 and into an end position in which lever 4 has approximately an angle of 30 degrees in relation to its original position. The pivoting of the lever 4 about the second axis II, is a rotational movement in a plane which runs approximately parallel to the outer contour of the hatch 1. Axis II (FIG. 4) essentially is vertical and transverse to the surface area of the hatch gate. Axis I runs parallel to the plane of the drawing of FIGS. 1 and 4.

As can be seen specifically in FIGS. 4, 5, 6, 7, and 8, lever 4 is connected with the shaft 13 through certain coupling elements, and lever 4 is also connected to the parallel running latching shaft 11 through other coupling elements. The connection to the shaft 13 is specifically obtained through a connecting rod 22, a first lever 23 being coupled to a second lever 24, which in turn is linked to a second connecting rod 25. A spring 25 maintains the lever end 23 in both of its respective end position which, with reference to axis I, is an over dead center position.

An extension element 27 as well as another connecting rod 28 is provided for connecting the lever 4 with the shaft 11. As shown specifically in FIGS. 1, 4, and 8, lever 4 is arranged with a respect to the hatch 1 such that a handle 29 at the free outer end of the lever 4 enters an indent or recess 30 in the skin of the hatch 1 whenever the lever 4 is in the first mentioned resting position. This recess 30 is closable through a movable flap 32 being flush with the door, and being biased by means of a spring 31. In addition, the flap 32 operates a latching hook 35 through a spring-biased rod linkage 33 and 34. The hook 35 grip behind a pin 37 which is arranged on an extension 36 of the lever 4. These elements 35, 36 and 37 constitute a supplemental block device which holds lever 4 in the inoperative position whenever the hatch 1 is closed.

The locking and monitoring device includes two additional securing pins 38 and 39 which are laterally arranged in about half height of the hatch gate 1 and reach and grip into appropriate recesses in the fuselage structure 3. These pins serve primarily to obtain a smooth outer contour in the transition between the hatch 1 and the fuselage 3. These pins, moreover, are coupled to the shaft 13 through cable connections 40 and 41 respectively.

Further details in the construction of the inventive actuating and operating device, will become more apparent from the description of the function of the equipment generally. First of all, it should be mentioned that the operating device 5 for opening and closing the hatch 1 and the locking and monitoring device are arranged in the fuselage such that they are accessible from the outside without additional auxiliary features. The illustrated position is such that it is assumed that the hatch is locked, and in the following then, the unlocking and unlatching of the hatch 1 will be described.

Specifically, the hatch is locked and latched. The lever 4, as stated, is flush with the outer contour of the hatch when in the resting position, the opening 30 is closed by the flap 32, and the pressure compensating flap 6 is likewise closed. Now, by forcing the flap 32 against force of the spring 31 in inner direction, the spring-loaded rod linkage 33 and 34 causes the latch hook 35 to retract and that releases the resting position of the lever 4. Simultaneously, the handle 29 becomes accessible, and now lever 4 can be pivoted about the first axis I covering a particular angular range which in this instant is on the basis of the chosen construction about 30 degrees (FIG. 8). The pivoting, of course, occurs in outer direction out of the contour of the hatch 1. After having assumed that position, the spring 26 will maintain the lever 4 in that position.

Owing to the described pivot motion (axis I) of the lever 4, rod 22 operates and actuates the lever 23 such that via a second lever 24 and the second rod 25, shaft 13 is being turned. Owing to the rotation of shaft 13 first of all, the pressure compensating flap 6 will open by operation of the bevel gear 19, as well as the coupling members 13, 16, 17, and 18. In addition, the cams 14 on the shaft 13 will be placed in a position vis-a-vis the adjacently located latching hooks 7 such that, in fact, the hooks 7 are released and can now be pivoted. In addition, the locking pins 38 and 39 are retracted into the hatch 1. If the unlatching is not exactly carried out as described, i.e. if the lever 4 is pivoted while not being in the terminal position (FIG. 8) assumed following the first pivoting, then the cams 14 simply block the hooks 7, and they cannot be released. This is what is meant by the monitoring function.

Now, it may be assumed that the unlocking has been carried out as required and in the correct fashion, the lever 4 can now be pivoted about the second, approximately horizontal axis II running basically transversely to the outer surface of the hatch 1. Pivoting about this second axis II is to cover about 105 degrees (FIG. 4), and as far as FIG. 1 is concerned is down and in clockwise direction, (counterclockwise in FIG. 4) which means that lever 4 had originally an almost horizontal position and is now turned into a near vertical position. During this motion, the unlatching proper occurs. The shaft 13 will no longer be moved and the cams 14, therefore, maintain their unlocking position.

Upon unlatching as mentioned, the pivoting of the lever 4 causes the cam element 27 to undergo a certain turning motion and through the sickle-shaped connecting rod 28 the latching shaft 11 is now being actuated. This means that up to this point a connection exists between the hooks 7 on one hand, and hooked pins 12 on the other hand; these elements are separated from each other. After the shaft 11 with the hooks 7 have been turned out of their respective original position, lever 4 can no longer be placed out of the first 30 degree position into the position in which it is flush with the hatch, because now the cams 14 are being blocked by the hooks 7 and that, in turn, makes it impossible that the shaft 13 can be rotated. If that is so then the lever 4 simply cannot be rotated any more about the axis I. In this fashion now, the hatch is unlocked, unlatched and can now be opened through separate facilities.

The latching and locking is basically the inverse of what has been described, and will be described with some detail next. It is now assumed that the hatch 1 itself has been closed but is still unlatched and unlocked. Upon turning the lever 4 about axis II (the lever still has a 30 degree position vis-a-vis the outer contour of the hatch). It is rotated counterclockwise in FIG. 1 and that movement causes the latching process. The actuating cam 27 as well as the connecting rod 28 and the shaft 11 are now moved through this rotation of the lever 4 about the axis II so that again all the hooks 7 will come into engagement with the respective locking pins 12.

Owing to that movement of the lever 4, the cams 14 are released and that means that through the shaft 13 can be rotated. This, of course, means that the lever 4 can be forced and pivoted about the axis I to assume again the position in which it is flush with the hatch. This pivot motion about the axis I of the lever 4 causes operation of the connecting rod 22, and the levers 23 and 24 are also operated so that through the connecting rod 25 the shaft 13 is turned. All hooks 7, as well as the shaft 11, are, in fact, mechanically scanned by means of the cams 14 whether or not the hooks 7 have, in fact, latching position, and the scanning and monitoring motion end such that the hooks 7 are blocked to remain in this correct position. Concurrently, of course, the pressure compensating flap 6 is closed which, in fact, is possible only if the shaft 11 was able to be rotated. In other words, the closing of the flap 6 is a visible indication that the mechanical scanning process and blocking of the hooks 7 has been successfully completed.

In addition the pins 38, and 39 are protracted. As soon as the lever 4 has completed the return motion about the axis I, a control surface of the hook 35 causes the hook 35 to engage lever 4, so that now the lever 4 is arrested in a flush position with the hatch 1.

Finally, it should be mentioned that an additional spring-loaded blocking structure 42 is provided in the central portion of the hatch 1. This structure 42 prevents that the shaft 11 and, therefore, the lever 4, can actually be moved at all when the gate and hatch 1 is completely open. The lever 4 can actually be moved only after the hatch has been closed, and the blocking structure 42 is, in fact, taken out of commission through a counterpart that is arranged in the fuselage and requires co-action with the blocking device 42.

The invention is not limited to the embodiments described above, but all changes and modifications thereof, not constituting departures from the spirit and scope of the invention are intended to be included.

I claim:

1. Operating device for latching and locking facilities in a hatch for a fuselage of an aircraft, comprising:
   an operating lever accessible from outside being mounted for pivoting about two approximately orthogonally oriented axes, being first and second axes accordingly;
   first, locking and monitoring means connected to said lever for being operated upon turning the lever about the first axis, for locking the hatch and monitoring a state of locking and latching;
   second, latching means being locked by said locking means until the pivot motion about the first axis has been completed, said second latching means including a shaft (i) and a plurality of latching hooks, cooperating with a plurality of latching pins mounted in the fuselage of the craft; and
   said first, locking means includes a particular shaft (ii) provided with cams, the shaft (ii) extending approximately parallel to the shaft (i), the cams depending on their position being capable of locking and unlatching said hooks;
   said latching means providing unlatching of the hatch when said lever is pivoted about the second axis but only after having been pivoted from a neutral position into an operating position by rotation about the first axis.

2. Device as in claim 1, wherein said first axis extends approximately vertical, the second axis being at least approximately perpendicular to the outer surface of the hatch.

3. Device as in claim 1, wherein said second latching means includes a shaft and a plurality of latching hooks, cooperating with a plurality of latching pins mounted in the fuselage of the craft.

4. Device as in claim 1, said shaft (i) being connected with a pressure compensating flap.

5. Device as in claim 1, wherein a blocking structure is provided to hold and lock the lever in a neutral position for closed, locked, and latched hatch.

6. Device as in claim 5, wherein said neutral position is such that the lever is flush with the outer contour of the hatch.

7. Device as in claim 6, said lever having a handle, there being an indent in the hatch for receiving the handle, there being a pivotable spring-loaded flap for closing the indent.

8. Device as in claim 7, wherein said flap is operatively connected with the blocking structure for the lever.

9. Device as in claim 1, including retractable safety pins connected to the shaft (ii).

* * * * *